(12) United States Patent
Vakil et al.

(10) Patent No.: US 9,481,573 B2
(45) Date of Patent: Nov. 1, 2016

(54) STEAM REFORMER BASED HYDROGEN PLANT SCHEME FOR ENHANCED CARBON DIOXIDE RECOVERY

(75) Inventors: Tarun D. Vakil, Houston, TX (US); Ulrich Wolf, Egelsbach (DE)

(73) Assignees: L'Air Liquide, Société Anonyme pour l'Etude et l'Exploitation des Procédés Georges Claude, Paris (FR); Lurgi GmbH, Frankfurt (DE)

(*) Notice: Subject to any disclaimer, the term of this patent is extended or adjusted under 35 U.S.C. 154(b) by 965 days.

(21) Appl. No.: 13/396,229

(22) Filed: Feb. 14, 2012

(65) Prior Publication Data

US 2012/0141368 A1    Jun. 7, 2012

Related U.S. Application Data

(62) Division of application No. 12/267,641, filed on Nov. 10, 2008, now abandoned.

(60) Provisional application No. 61/088,420, filed on Aug. 13, 2008, provisional application No. 61/093,746, filed on Sep. 3, 2008, provisional application No. 61/108,273, filed on Oct. 24, 2008.

(51) Int. Cl.
| C01B 3/36 | (2006.01) |
| C01B 3/38 | (2006.01) |
| C01B 3/48 | (2006.01) |

(Continued)

(52) U.S. Cl.
CPC .............. *C01B 3/382* (2013.01); *C01B 3/384* (2013.01); *C01B 3/48* (2013.01); *C01B 3/52* (2013.01); *C01B 3/56* (2013.01); *C01B 2203/0233* (2013.01); *C01B 2203/0283* (2013.01); *C01B 2203/0288* (2013.01); *C01B 2203/043* (2013.01); *C01B 2203/0405* (2013.01); *C01B 2203/0415* (2013.01); *C01B 2203/0475* (2013.01); *C01B 2203/141* (2013.01); *C01B 2203/146* (2013.01); *C01B 2203/147* (2013.01);

(Continued)

(58) Field of Classification Search
CPC .............. C01B 2203/0475; C01B 2203/0233; C01B 2203/043; C01B 2203/0283; C01B 2203/0811; C01B 2203/1241; C01B 3/48; C01B 3/56; C01B 2203/0415; C01B 2203/0822; C01B 2203/0827; C01B 2203/146
See application file for complete search history.

(56) References Cited

U.S. PATENT DOCUMENTS

| 4,553,981 A | 11/1985 | Fuderer |
| 4,869,894 A * | 9/1989 | Wang ...................... C01B 3/16 423/650 |

(Continued)

FOREIGN PATENT DOCUMENTS

| DE | 3602352 | 7/1987 |
| EP | 1146009 | 10/2001 |
| EP | 1582502 | 10/2005 |

OTHER PUBLICATIONS

PCT Search Report and Written Opinion for PCT/IB2009/053566.

*Primary Examiner* — Imran Akram
(74) *Attorney, Agent, or Firm* — Elwood L. Haynes (57) ABSTRACT

A novel steam reformer unit design, a novel hydrogen PSA unit design, a novel hydrogen/nitrogen enrichment unit design, and novel processing scheme application are presented.

5 Claims, 4 Drawing Sheets

(51) Int. Cl.
  *C01B 3/52* (2006.01)
  *C01B 3/56* (2006.01)
(52) U.S. Cl.
  CPC ............ *Y02C 10/04* (2013.01); *Y02P 20/129* (2015.11); *Y02P 30/30* (2015.11)

(56) References Cited

U.S. PATENT DOCUMENTS

| | | | |
|---|---|---|---|
| 4,963,339 A | 10/1990 | Krishnamurthy | |
| 5,000,925 A | 3/1991 | Krishnamurthy | |
| 6,214,066 B1 | 4/2001 | Nataraj et al. | 48/198.2 |
| 2002/0073845 A1 | 6/2002 | Reddy | |
| 2002/0152889 A1* | 10/2002 | Baker | B01D 53/228 95/45 |
| 2006/0137246 A1* | 6/2006 | Kumar | B01J 8/0257 48/61 |
| 2006/0171878 A1* | 8/2006 | Blumenfeld | B01D 53/04 423/644 |
| 2007/0000176 A1* | 1/2007 | Liu | B01J 8/0438 48/198.1 |
| 2008/0141643 A1* | 6/2008 | Varatharajan | F02C 1/002 60/39.5 |
| 2009/0117024 A1* | 5/2009 | Weedon et al. | 423/437.1 |
| 2010/0260657 A1* | 10/2010 | Niitsuma | B01D 53/226 423/437.1 |
| 2010/0303703 A1* | 12/2010 | Filippi | C01B 3/025 423/359 |
| 2011/0223090 A1* | 9/2011 | Filippi et al. | 423/360 |

\* cited by examiner

STEAM REFORMER BASED HYDROGEN PLANT SCHEME FOR ENHANCED CARBON DIOXIDE RECOVERY

CROSS-REFERENCE TO RELATED APPLICATIONS

This application claims the benefit of U.S. Provisional Application No. 61/088,420, filed Aug. 13, 2008, U.S. Provisional Application No. 61/093,746 filed Sep. 3, 2008, U.S. Provisional Application No. 61/108,273, filed Oct. 24, 2008, and is a divisional of U.S. patent application Ser. No. 12/267,641, filed Nov. 10, 2008, the entire contents of which are incorporated herein by reference.

FIELD OF THE INVENTION

This invention relates to novel steam reformer unit design, a novel hydrogen PSA unit design, a novel hydrogen/nitrogen enrichment unit design, and a novel processing scheme application.

BACKGROUND

The production of hydrogen by the steam reforming of hydrocarbons is well known. In the basic process, a hydrocarbon, or a mixture of hydrocarbons, is initially treated to remove, or convert and then remove, trace contaminants, such as sulfur and olefins, which would adversely affect the reformer and the down stream water gas shift unit catalyst. Natural gas containing predominantly methane is a preferred starting material since it has a higher proportion of hydrogen than other hydrocarbons. However, light hydrocarbons or refinery off gases containing hydrocarbons, or refinery streams such as LPG, naphtha hydrocarbons or others readily available light feeds might be utilized as well.

The pretreated hydrocarbon feed stream is typically at a pressure of about 200 to 400 psig, and combined with high pressure steam, which is at a higher than the feed stream pressure, before entering the reformer furnace. The amount of steam added is much in excess of the stoichiometric amount. The reformer itself conventionally contains tubes packed with catalyst through which the steam/hydrocarbon mixture passes. An elevated temperature, e.g. about 1580° F., or 860° C., is maintained to drive the endothermic reaction.

The effluent from the reformer furnace is principally hydrogen, carbon monoxide, carbon dioxide, water vapor, and methane in proportion close to equilibrium amounts at the furnace temperature and pressure. The effluent is conventionally introduced into a one- or two-stage water gas shift reactor to form additional hydrogen and carbon dioxide. The shift reactor converts the carbon monoxide to carbon dioxide by reaction with water vapor, which generates additional Hydrogen. This reaction is endothermic. The combination of steam reformer and water gas shift converter is well known to those of ordinary skill in the art.

If $CO_2$ capture from the high pressure syngas stream exiting the water gas shift unit is desired, the shift converter effluent, which comprises hydrogen, carbon dioxide and water with minor quantities of methane and carbon monoxide is introduced into a conventional absorption unit for carbon dioxide removal. Such a unit operates on the well-known amine wash or Benfield processes wherein carbon dioxide is removed from the effluent by dissolution in an absorbent solution, i.e. an amine solution or potassium carbonate solution, respectively. Conventionally, such units can remove up to 99 percent or higher of the carbon dioxide in the shift converter effluent.

The effluent from the carbon dioxide absorption unit is introduced into a pressure swing adsorption (PSA) unit. PSA is a well-known process for separating essentially pure hydrogen from the mixture of gases as a result of the difference in the degree of adsorption among them on a particulate adsorbent retained in a stationary bed.

Conventionally, the remainder of the PSA unit feed components, after recovery of pure hydrogen product, which comprises carbon monoxide, the hydrocarbon, i.e. methane, hydrogen and carbon dioxide, is returned to the steam reformer furnace and combusted to obtain energy for use therein To practice $CO_2$ emissions capture from such hydrogen plants, one must consider total emissions resulting from the plant, which includes $CO_2$ recovery from reformer furnace flue gas as well.

The $CO_2$ emissions from a steam reformer based conventional hydrogen plant originate from the reformer furnace flue gas. The root source of this total $CO_2$ in the furnace flue gas results from two sources:

(a) the reaction within the reformer tubes and shift; and
(b) the combustion of fuel in reformer furnace.

Each source contributes between about 40 and about 60% of the total $CO_2$ emitted through the reformer furnace flue gas. For $CO_2$ capture, conventional schemes employed consist of:

(a) removal of $CO_2$, only from the high pressure syngas stream exit shift unit;
(b) removal of $CO_2$, only from the reformer furnace flue gas; and
(c) removal of $CO_2$ via both (a) and (b) above.

Option (a) permits about 50 to about 60% of total $CO_2$ emissions capture. Option (b) permits about 90% of total $CO_2$ emissions capture. Option (c) permits about 95% of the total $CO_2$ emissions capture. Option (a) permits only partial capture at reasonable cost, Option (b) is considered the most expensive of the three options, capital and utility requirements wise. Option (c) is also expensive, utility intensive and quite elaborate.

Therefore, it is very desirable and cost effective to have a H2 plant design that results in between about 85% and about 95%+ of total $CO_2$ capture, solely from the high pressure syngas stream exit water gas shift reactor.

SUMMARY

The present invention is a novel steam reformer design and method using the same. This method includes a variety of steps of which the first is to provide a first gas mixture. This first gas mixture may comprise natural gas containing mostly methane, light hydrocarbons, refinery off gases containing hydrocarbons, refinery streams such as LPG, naphtha hydrocarbons or other readily available light feeds. Step two involves introducing said first gas mixture into either a pre-reformer followed by a primary reformer, or directly into a primary reformer, thereby generating a second gas mixture comprising hydrogen, carbon monoxide, carbon dioxide. The novelty here is in the design and operating parameters of the primary reformer. The third step of the method includes introducing said second gas mixture into at least one isothermal shift reactor, or a combination of a high followed by a low temperature shift reactor, or a medium temperature shift reactor, thereby generating a third gas mixture. Step four includes introducing said third gas mixture into an amine wash, wherein said third gas is separated into a fourth gas mixture and a carbon dioxide enriched stream. The fifth step includes introducing said fourth gas mixture into a standard hydrogen PSA, wherein said fourth gas is separated into a hydrogen enriched stream and a PSA purge gas stream. In the final step, the reformer furnace uses the PSA purge gas as fuel with the supplemental fuel or remainder of the fuel for the reformer furnace being natural gas or a portion of the feed hydrocarbon stream, or any other external fuel. By virtue of the novel reformer, the syngas/flue gas CO2 distribution is higher than the conventional design.

In one embodiment of the present invention, the novel steam reformer design along with a novel hydrogen PSA design that is lower cost is used. Additionally, this embodiment is self-sufficient in reformer furnace fuel requirements and therefore does not require any import of supplemental fuel. This embodiment is the same with regard to steps one to four above but differs in the remaining steps. More specifically, the fifth step of this embodiment includes introducing said fourth gas mixture into either a standard recovery or a special low recovery PSA, wherein said fourth gas is separated into a hydrogen enriched stream and a PSA purge gas stream. In this particular embodiment, the reformer furnace uses all of the PSA purge gas as fuel. Additionally, it uses a novel hydrogen PSA design that is lower cost. By virtue of this novel PSA design, the PSA purge gas is sufficient to satisfy all fuel requirements of the reformer furnace. Because the scheme is self-sufficient in reformer furnace fuel requirements, there is no requirement of any import of supplemental fuel. By virtue of the novel reformer and the novel PSA designs, the syngas/flue gas CO2 distribution is higher than the conventional design.

In a still further embodiment of the present invention, the novel steam reformer design is used along with a novel hydrogen PSA design that is lower cost. This embodiment is self-sufficient in reformer furnace fuel requirements and therefore, does not require any import of supplemental fuel. Additionally, a second novel gas separation unit is designed to be included in this embodiment (preferably an adsorption based unit although a membrane or a cryogenic separation unit may be used) that separates the compressed primary PSA unit purge gas into two streams—one that is recycled back as feed to the reforming section and the other that is used as reformer furnace fuel. Steps one to four of this embodiment are the same with regard to steps one to four above. The fifth step includes introducing said fourth gas mixture into either a standard recovery or a special low recovery PSA, wherein said fourth gas is separated into a hydrogen enriched stream and a PSA purge gas stream. A second novel gas separation unit is additionally employed, preferably an adsorption based unit, that separates the compressed primary PSA unit purge gas into two streams, one that is recycled back as feed to the reforming section and the other that is used as reformer furnace fuel. While an adsorption based unit is preferred, a membrane or a cryogenic separation unit may also be used. The scheme is self-sufficient in reformer furnace fuel requirements and therefore, does not require any import of supplemental fuel. By virtue of the novel reformer, the novel primary hydrogen PSA, and the novel second adsorption based separation unit, the syngas/flue gas CO2 distribution is higher than the conventional design.

BRIEF DESCRIPTION OF DRAWINGS

The invention may be understood by reference to the following description taken in conjunction with the accompanying drawings, and in which.

DESCRIPTION OF PREFERRED EMBODIMENTS

The present invention is based on the design of a novel steam reformer unit, a novel hydrogen PSA unit design, a novel hydrogen/nitrogen enrichment unit design, and novel processing scheme application. These innovations result in re-allocating most of the total hydrogen plant CO2 emissions load to the high pressure syngas stream, or streams, exiting the water gas shift reactor while minimizing the CO2 emissions load from the reformer furnace flue gas. As compared to the conventional 60/40 split of total CO2 emissions in syngas/flue gas streams for steam reformer based conventional hydrogen plant designs, the present invention results in 85/15 or better CO2 split. This will permit about 85% or better of the total CO2 emissions load to be captured from syngas stream, using the conventional, well proven and cost effective amine scrubbing technology. Such 85% or better CO2 capture is much greater than the 55% to 60% maximum possible using conventional steam reformer based hydrogen plant technology. Since CO2 recovery from high pressure syngas stream is much easier and cost effective compared to that from low pressure reformer furnace flue gases, a major cost benefit for equivalent CO2 recovery results with the present invention.

The described H2 plant design would permit recovery of between about 85% and about 95%+ of the total plant CO2 generation from the high pressure syngas stream as opposed to the customary 50% to 60%. Current thinking among industry experts indicates that such 85% to 95%+ of total CO2 recovery is a good practical target leading to achieving goals of "greenhouse gas sequestration". In such case, it would be of significant value to have means of doing so in a cost effective way. Current conventional H2 plants use steam reformer based technology that permits only 50% to 60% of the total CO2 emissions to be recovered cost effectively from the high pressure syngas stream upstream of the PSA unit. The remaining 40% or so ends up in the reformer furnace flue gas which is at near atmospheric pressure, having low CO2 concentrations.

CO2 recovery from reformer furnace flue gas is not practiced conventionally. There are processes currently being developed due to interest in total CO2 capture. Only one or two processes can claim success in CO2 recovery from flue gases on a commercial scale though. Large scale applications using these limited processes have not yet been commercially established with long term reliable operation. The prevailing much lower CO2 partial pressure in the flue gas, resulting from low CO2 concentration and very low total flue gas pressure, makes it much more difficult to capture CO2. Further, flue gas pressure is very low, near atmospheric, which will require compression, Large flue gas volumes make this expensive. Further, presence of residual 1 mol % to 3 mol % O2 in flue gas make the application prone to severe equipment corrosion and solvent degradation due to oxidation reactions. In addition, due to the presence of contaminants such as NOX, SOX, particulates etc., the flue gas requires significant scrubbing and clean-up before it can be processed in the CO2 recovery unit. All of these factors make flue gas equipment very expensive and the process very energy intensive, compared to CO2 recovery for high pressure syngas stream such as the water gas shift reactor effluent.

In comparison, the CO2 recovery from high pressure, higher CO2 concentration syngas stream exit the water gas shift unit is much easier, conventional and quite a bit less expensive. The high pressure of the syngas stream, coupled with higher CO2 concentration results in a much higher CO2 partial pressure which makes CO2 removal easy. No special scrubbing or removal of contaminants is required, and the stream can be used directly in the conventional amine scrubbing unit for CO2 recovery. Such CO2 removal from high pressure syngas streams has been conventionally practiced in industry for more than 20 to 30 years.

Therefore, a process that changes the CO2 split in syngas/flue gas from conventional 60%/40% to about 95%/5% is very desirable from CO2 recovery view point.

The present invention has several novel components; these can be applied either separately, or in combination, as deemed suitable for given application at hand. The present invention is a method of re-distributing CO2 balance from reformer furnace flue gas to the high pressure syngas exit water gas shift reaction unit, and then applying concepts of gas separation using novel processes.

Figure 1:
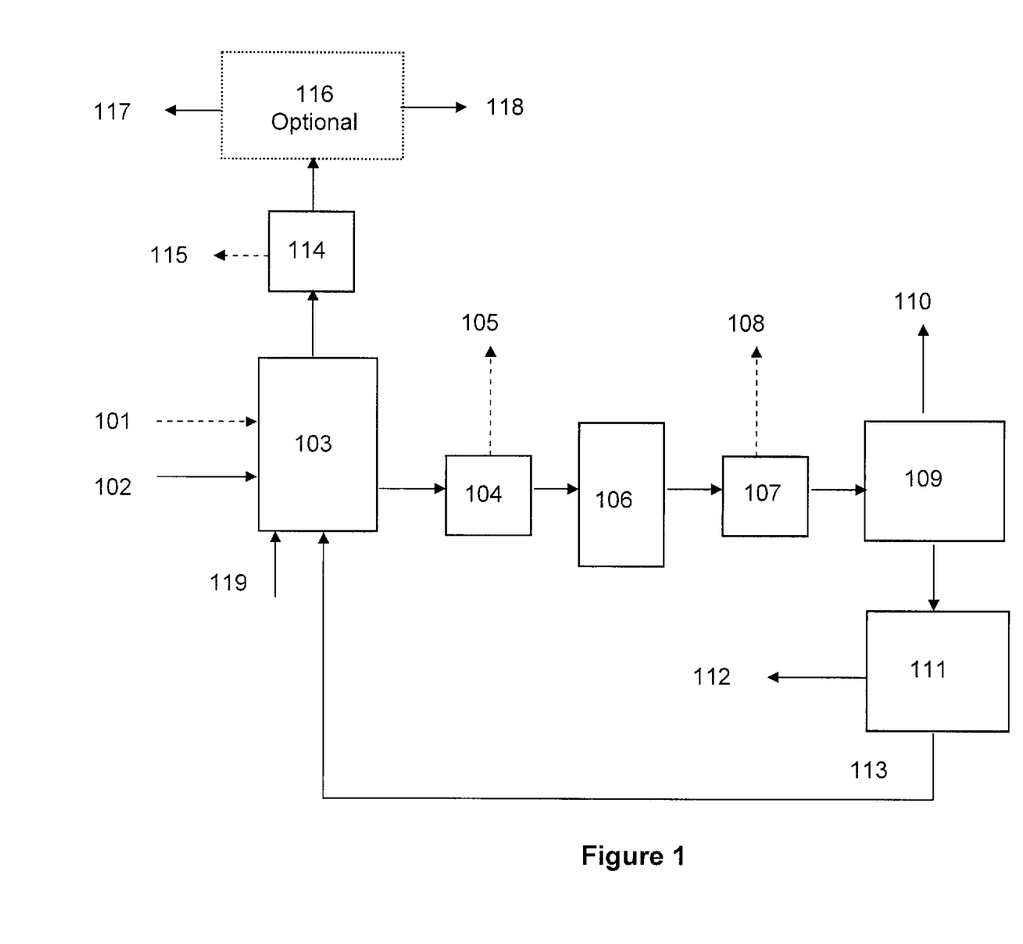
FIG. 1 is a schematic representation of a conventional SMR based hydrogen plant with carbon dioxide recovery.

The conventional SMR based hydrogen plant with carbon dioxide recovery is illustrated in FIG. 1. It uses a standard steam methane reformer (SMR) technology 103 followed by high temperature water gas shift reactor 106 to take a hydrocarbon stream 102 and a steam stream 101, and to produce a hydrogen rich syngas stream containing hydrogen, a significant amount of carbon dioxide, carbon monoxide, methane, nitrogen and other minor impurities. This syngas is cooled in waste heat recovery equipment 104 to generate steam 105. The syngas is then routed to a water gas shift unit 106, typically a high temperature shift unit, for conversion of carbon monoxide to additional hydrogen by reaction with water vapor. This syngas is further cooled in waste heat recovery equipment 107 to generate steam 108. The cooled syngas is purified in a carbon dioxide recovery unit 109, thereby recovering carbon dioxide 110. The 'sweet' syngas is then further purified in a pressure swing adsorber (PSA) unit 111 for recovering a relatively pure hydrogen product 112. The residual contents of the syngas stream, after hydrogen product recovery 113 is used as fuel for the reforming furnace. Typically, the PSA purge gas is not enough to satisfy the total reformer furnace fuel requirements. The supplemental fuel requirements for the reformer furnace are provided by import NG or other suitable fuel 119. The reformer furnace flue gas is cooled in waste heat recovery units 114 to generate steam 115 and to preheat reformer feed streams. The flue gas also contains significant amounts of carbon dioxide. Where required or desired, this carbon dioxide is removed in a special amine wash system 116, which produces relatively pure carbon dioxide 117 and residual flue gas 118.

Customary practice has been to not capture any CO2 from reformer furnace flue gases. In case it is desired to do so, the available current technology for carbon dioxide recovery from flue gas, is based on specially designed amine based scrubbing system. Such CO2 removal systems for low pressure flue gas stream is quite different that commonly employed for CO2 removal from high pressure syngas streams. The much lower carbon dioxide percentage in flue gas, and very low total pressure of flue gas make it very difficult to capture carbon dioxide. Flue gas CO2 recovery systems are relatively new, and tend to be expensive due to the flue gas stream containing significant amounts of water and between about 1 and about 3 mole % oxygen. The oxygen presence in flue gas tends to corrode the equipment and degrade the solvent. The low flue gas pressure and low carbon dioxide concentration results in very low CO2 partial pressure, which requires physically larger equipment, and the capture requires a very reactive solvent. The presence of moisture and carbon dioxide typically pose corrosion issues as well. The utility and energy requirements are significantly greater as compared to that for conventional, CO2 recovery systems from high pressure syngas stream.

In comparison, the carbon dioxide recovery from the high pressure syngas stream is much easier, without severe corrosion issues, and is much less expensive. Utility and energy requirements are significantly lower as compared to the flue gas CO2 recovery systems.

Therefore, it is very desirable and cost effective to have a hydrogen plant design that allows 85% to 95%+carbon dioxide recovery from syngas stream alone.

Figure 2:
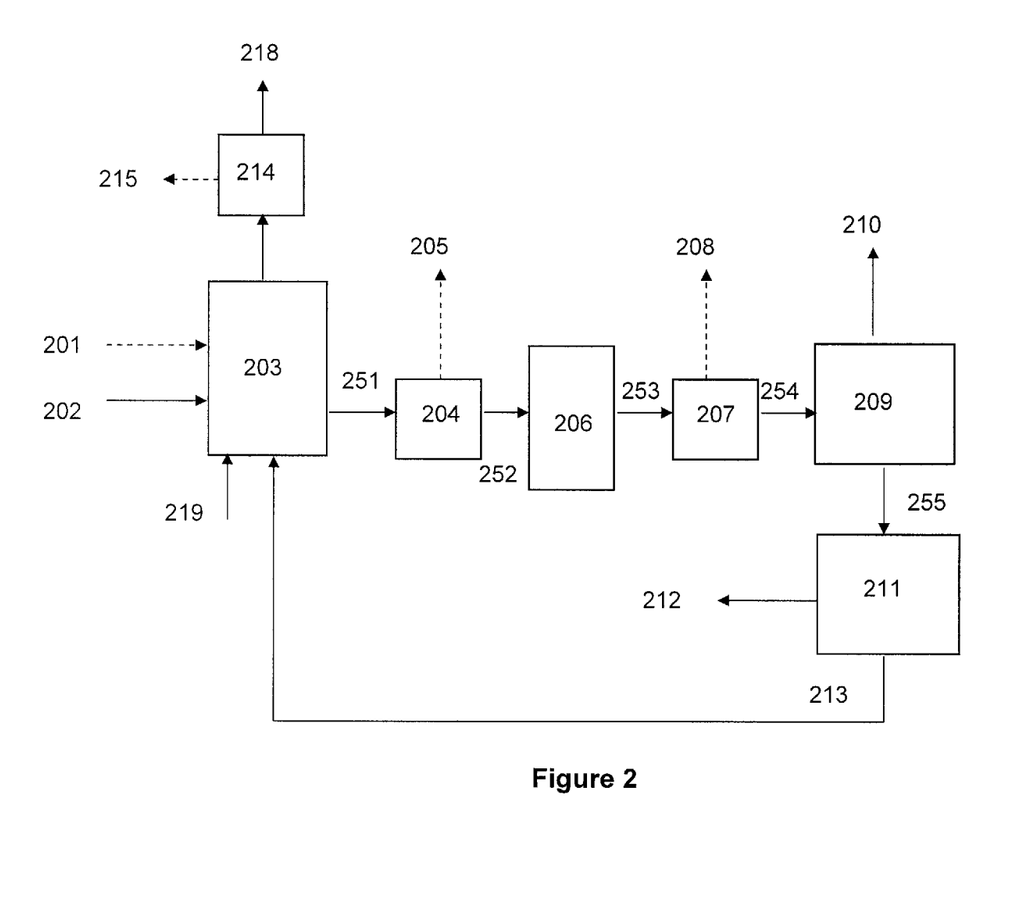
FIG. 2 is a schematic representation of one embodiment of the present invention.

The present invention would permit recovery of between about 85% and about 95% of the total plant carbon dioxide generation from a high pressure syngas stream, as opposed to the customary 50% to 60%. With this in mind, it is desirable to design an SMR (primary reformer) based process that contains between about 85% and about 95% (as opposed to the conventional art 50 to 60%) of total carbon dioxide in the high pressure syngas stream. The novel scheme will permit reasonable CO2 recovery (85% to 95%) from syngas stream alone, thereby not requiring any further CO2 recovery from flue gas. The instant invention describes process configurations, and operating conditions, which allow one to achieve these objectives:

Turning now to FIG. 2 which illustrates one embodiment of the present invention, hydrocarbon stream 202 and steam stream 201 are introduced to pre-reformer followed by a novel primary reformer, or simply a novel primary reformer 203, wherein a syngas stream 251 comprising at least carbon dioxide and hydrogen is produced. The reformer furnace flue gas is cooled in waste heat recovery units 214 to generate steam 215, to preheat reformer feed streams, and residual flue gas 218. Syngas stream 251 is sent to a waste heat recovery unit 204 to recover steam 205. The exit of waste heat recovery, stream 252 is then introduced to a high temperature shift reactor followed by a low temperature shift reactor, or alternatively either an isothermal or a medium temperature shift reactor (symbolically represented by 206). This produces a carbon dioxide richer stream 253. Carbon dioxide richer stream 253 is further cooled in waste heat recovery unit 207 to generate steam 208, and a cooler syngas stream 254. Stream 254 is introduced into a CO2 recovery unit 209 to recover enriched CO2 stream 210 and sweet syngas stream 255. The sweet syngas stream goes to a conventional PSA unit 211, wherein relatively pure hydrogen 212 is recovered, and residual stream 213 is sent to the primary reformer furnace as fuel. Additional supplemental fuel 219 is added to the reformer furnace as required.

Another aspect of the present invention includes the design of a novel PSA unit for H2 recovery from syngas. When this is used in conjunction with the novel steam reformer, a process results (shown in FIG. 3).

Figure 3:
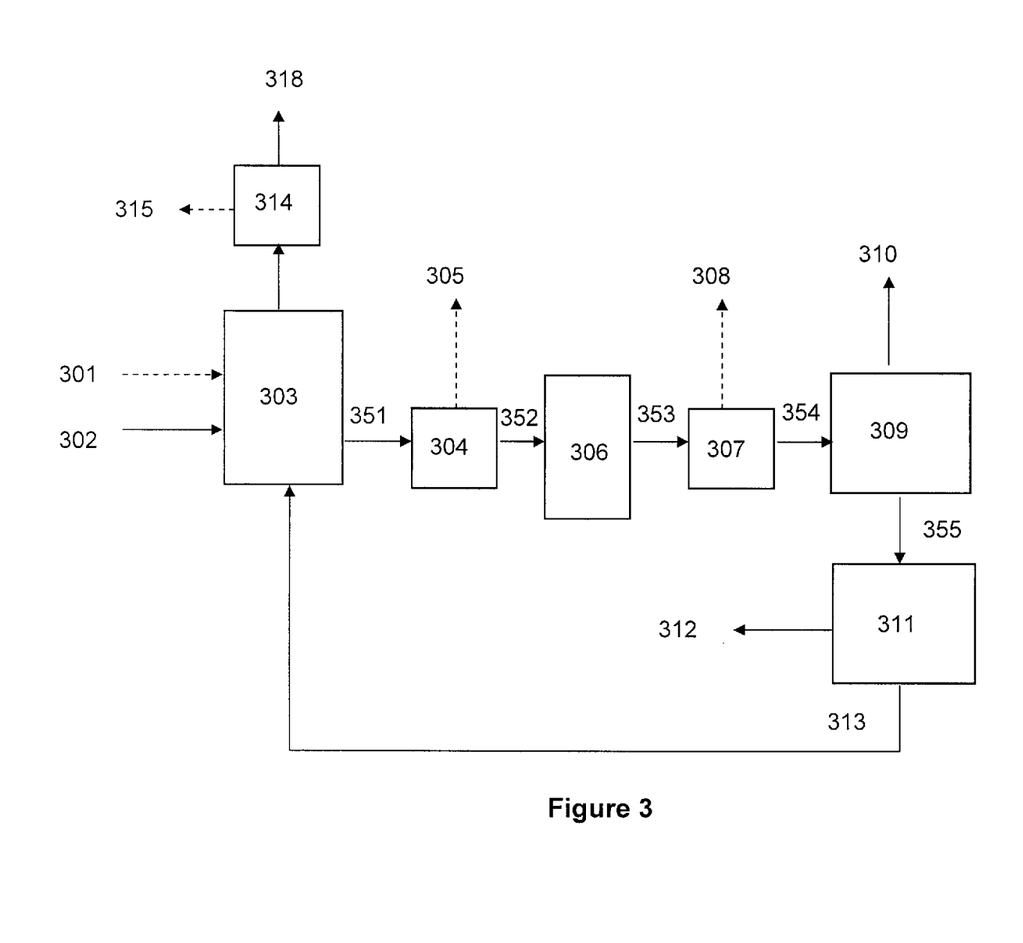
FIG. 3 is a schematic representation of another embodiment of the present invention.

Turning now to FIG. 3 which illustrates another embodiment of the present invention, hydrocarbon stream 302 and steam stream 301 are introduced to pre-reformer followed by a novel primary reformer, or simply a novel primary reformer 303, wherein a syngas stream 351 comprising at least carbon dioxide and hydrogen is produced. The reformer furnace flue gas is cooled in waste heat recovery units 314 to generate steam 315, to preheat reformer feed streams, and residual flue gas 318. Syngas stream 351 is sent to a waste heat recovery unit 304 to recover steam 305. The exit of waster heat recovery stream 352 is then introduced to a high temperature shift reactor followed by a low temperature shift reactor, or alternatively either an isothermal or a medium temperature shift reactor (symbolically represented by 306). This produces a carbon dioxide richer stream 353. Carbon dioxide richer stream 353 is further cooled in waste heat recovery unit 307 to generate steam 308, and a cooler syngas stream 354. Stream 354 is introduced into a CO2 recovery unit 309 to recover enriched CO2 stream 310 and sweet syngas stream 355. The sweet syngas stream goes to a novel PSA unit 311 that has intentionally designed low H2 recovery and is lower in cost than conventional, wherein relatively pure hydrogen 312 is recovered, and residual stream 313 is sent to the primary reformer furnace as fuel. Additional supplemental fuel is not required.

Another aspect of the invention includes the design of a novel PSA unit for H2 recovery from syngas. When this is used in conjunction with the novel steam reformer, a process results (shown in FIG. 4).

Figure 4:
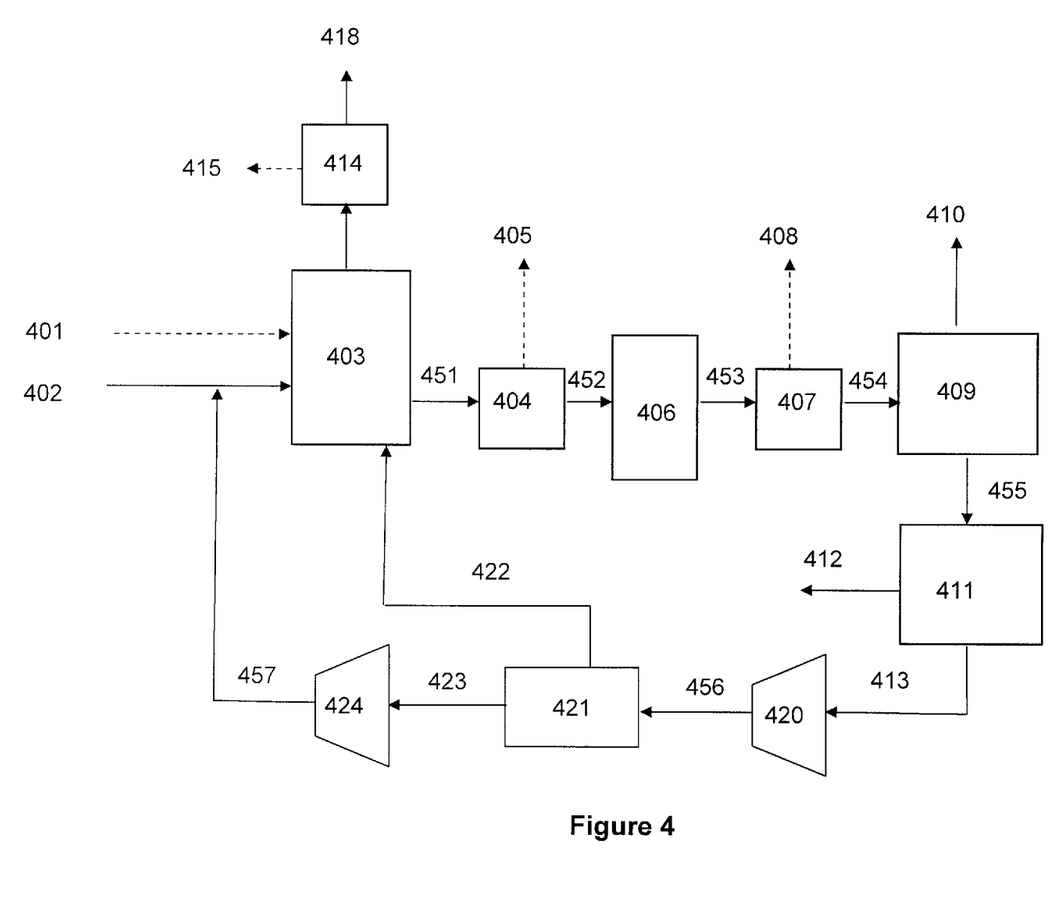
FIG. 4 is a schematic representation of a still further embodiment of the present invention.

Turning now to FIG. 4 which illustrates another embodiment of the present invention, hydrocarbon stream 402 and steam stream 401 are introduced to pre-reformer followed by a novel primary reformer, or simply a novel primary reformer 403, wherein a syngas stream 451 comprising at least carbon dioxide and hydrogen is produced. Syngas stream 451 is sent to a waste heat recovery unit 404 to recover steam 405. The exit of waste heat recovery stream 452 is then introduced to a high temperature shift reactor followed by a low temperature shift reactor, or alternatively either an isothermal or a medium temperature shift reactor (symbolically represented by 406). This produces a carbon dioxide richer stream 453. Carbon dioxide richer stream 453 is further cooled in waste heat recovery unit 407 to generate steam 408, and a cooler syngas stream 454. Stream 454 is introduced into a CO2 recovery unit 409 to recover enriched CO2 stream 410 and sweet syngas stream 455. The sweet syngas stream 455 goes to a novel PSA unit 411 that has been intentionally designed for low H2 recovery and is lower in cost than conventional designs, wherein relatively pure hydrogen 412 is recovered. In some variations, the PSA unit 411 can be a conventional unit with conventional H2 recovery to save costs of tail gas 413 compression. The residual tail gas stream 413 is compressed in unit 420 to obtain compressed tail gas stream 456 which is sent to another novel gas separation unit 421 (adsorption based preferred, but a membrane or a cryogenic unit may also be used) where the tail gas stream is separated into two streams: one enriched in nitrogen and hydrogen, and the other enriched in hydrocarbons. The hydrogen and nitrogen enriched stream will have at least 40% of the total nitrogen present in the feed to the unit, along with at least 90% of the hydrogen present in the feed to the unit. The hydrogen/ nitrogen rich stream 422 is sent to the primary reformer furnace 403 as fuel and the other hydrocarbon rich stream 423 is compressed in unit 424 to form stream 457. Stream 457 is recycled to the reformer area as partial feed. Additional supplemental fuel is not required.

It will be recognized that the novel steam reformer, the novel H2 PSA, and the separation of the PSA purge gas using a novel process are novel process unit designs of this invention, with specific operating conditions of, at least, temperature, pressure, and composition, and concept and/or application in some cases, which are novel; all other units by themselves are conventional.

The following examples illustrate some details and benefits of the present invention.

Note, as used herein, the term "steam to carbon ratio" is understood to have units of Lb-mole steam/Lb-atoms of carbon.

Base Case (FIG. 1): Conventional Hydrogen Plant Design

Supplemental hydrocarbon fuel required
Low temperature shift not used
Standard reformer process and furnace conditions (size=100% base)
Standard PSA design and recovery
Standard steam to carbon ratio
100 to 120 MMSCFD hydrogen product flow
About 57% of total carbon dioxide recovered from syngas
Carbon dioxide released to the atmosphere from flue gas (43% of total)
No flue gas CO2 recovery practiced.
Plant efficiency at 100% base.

Example 1

FIG. 2

Supplemental hydrocarbon fuel not required
Low temperature shift used
Novel reformer process and furnace conditions (size=same as base)
Standard PSA design and recovery
Novel steam to carbon ratio
Hydrogen product flow (100% of base)
Carbon dioxide recovered from syngas (67% of total)
Carbon dioxide released to the atmosphere from flue gas (33% of total)
No flue gas carbon dioxide recovery employed
Plant efficiency (marginally better than base)

Example 2

FIG. 3

Supplemental hydrocarbon fuel not required
Low temperature shift used
Novel reformer process and furnace conditions (size=100% base)
Novel PSA design and recovery (less beds used, less expensive than base)
Novel steam to carbon ratio
Hydrogen product flow (70% of base)
Carbon dioxide recovered from syngas (89% of total)
Carbon dioxide released to the atmosphere from flue gas (11% of total)
No flue gas carbon dioxide recovery required
Plant energy within 8% of base.

Example 3

FIG. 3

Supplemental hydrocarbon fuel not required
Low temperature shift used
Novel reformer process and furnace conditions (size=133% base)
Novel PSA design and recovery (less beds used, less expensive than base)
Novel steam to carbon ratio
Hydrogen product flow (100% of base)

Carbon dioxide recovered from syngas (90% of total)
Carbon dioxide released to the atmosphere from flue gas (10% of total)
No flue gas carbon dioxide recovery required
Plant energy within 7% of base.

Example 4

FIG. 4

Supplemental hydrocarbon fuel not required
Low temperature shift used
Novel reformer process and furnace conditions (size=100% base)
Novel PSA design and recovery (less beds used, less expensive than base)
Novel steam to carbon ratio
Hydrogen product flow (69% of base)
Carbon dioxide recovered from syngas (>98% of total)
Carbon dioxide released to the atmosphere from flue gas (<2% of total)
Novel tail gas separation unit employed for recycle to reformer feed
No flue gas carbon dioxide recovery required
Plant energy within 12% of base.

Example 5

FIG. 4

Supplemental hydrocarbon fuel not required
Low temperature shift used
Novel reformer process and furnace conditions (size=133% base)
Novel PSA design and recovery (less beds used, less expensive than base)
Novel steam to carbon ratio
Hydrogen product flow (100% of base)
Carbon dioxide recovered from syngas (>98% of total)
Carbon dioxide released to the atmosphere from flue gas (<2% of total)
Novel tail gas separation unit employed for recycle to reformer feed
No flue gas carbon dioxide recovery required
Plant energy within 9% of base.

In another embodiment of the present invention the primary reformer tube exit temperatures is between about 1700° F. (927° C.) and about 1750° F. (954° C.), preferably about 1730° F. (943° C.). This is in contrast with the conventional primary reformer tube exit temperature of between about 1600° F. (871° C.) and about 1650° F. (899° C.).

In another embodiment of the present invention, the primary reformer furnace bridge wall temperatures is between about 1850° F. (1010° C.) and 1950° F. (1066° C.), preferably about 1900° F. (1038° C.). This is in contrast with the conventional primary reformer furnace bridge wall temperatures of between about 1950° F. (1066° C.) and about 2050° F. (1121° C.). The temperature difference at the reformer furnace bridge wall, is herein defined as the bridge wall temperature minus the primary reformer tube exit temperature.

In a still further embodiment, a carbon ratio of between about 3.0 and 4.0, preferably about 3.2, is used. This is in contrast to the conventional value of about 2.8.

In yet another embodiment, other process conditions such as pressure, temperature and composition are adjusted as necessary in order to achieve no more than about 1 mol % (preferably less than about 0.5%) dry carbon monoxide slip and about 2 mol % (preferably less than about 0.5%) dry methane slip in the syngas stream at the inlet to the PSA, both on dry mol % basis.

In another embodiment, a low recovery PSA is used to recover only an amount of hydrogen that leaves enough un-recovered PSA purge gas stream sufficient to satisfy total supplemental fuel requirements of the reformer furnace. This low recovery PSA has a hydrogen recovery of between about 50% and about 65%, in contrast with the conventional system which has a hydrogen recovery of about 87%. The use of a low recovery PSA will preclude the need for any external hydrocarbon based supplemental fuel requirement.

The use of such low recovery PSA designs will permit the use of less adsorption beds, typically between 4 and 10, preferably between 5 and 9, more preferably between 6 and 8, and still more preferably between 4 and 5. This is contrasted with the 10 to 14 beds typically required for a hydrogen plant with 100 to 120 MMSCFD (28,316 to 33,979 NCMD at 16° C.) hydrogen product capacity.

In still another embodiment, the PSA hydrogen recovery is adjusted so that the purge fuel gas from the PSA flow is sufficient for all fuel demands in the primary reformer furnace. No additional supplemental fuel is used.

In yet still another embodiment, the primary reformer furnace excess air is adjusted in order to achieve a stable flame with essentially all of the hydrogen containing fuel, while establishing a reasonable limit on adiabatic flame temperature (typically less than about 4000° F., 2204° C.).

In another embodiment, at least about 99% of the available carbon dioxide is recovered from a high pressure syngas stream upstream of PSA using a conventional technology such as, but not limited to, aMDEA, that are well proven and cost effective from capital and energy requirements view point. Any appropriate conventional technology known to the skilled artisan is appropriate.

In another embodiment, the novel PSA design permits higher than 1.2 Bara (17.4 psia) PSA purge gas pressure (typically between about 5 Bara and about 10 Bara, or about 72.5 psia and about 145 psia) due to the reduced recovery needs. The higher pressure helps minimize the size and cost of the associated compressor upstream of either an associated novel adsorption unit, a membrane unit or a cold box unit for further tail gas separation.

In another embodiment, a novel stand alone adsorption based gas separation unit is included for separation of the PSA (conventional or novel hydrogen PSA design down stream of syngas CO2 removal unit). This novel unit separates the PSA tail gas (purge gas) post compression, into two gas streams: one rich in H2 and N2, and the other rich in hydrocarbons. The H2/N2 rich stream is used as fuel in the reformer furnace; the hydrocarbon rich stream is compressed and recycled back to the reformer as feed.

In another embodiment, the membrane system may be operated at suitable pressures by further compressing the PSA purge gas (that exits the PSA unit at between about 5 Bara and about 10 Bara (about 72.5 psia and about 145 psia) such that the residue hydrocarbon stream exiting the membrane unit can be recycled back as part feed to the reformer without further compression. The membrane permeate stream will be used as fuel in the reformer furnace. No additional supplemental fuel will need to be imported.

In another embodiment, where the cold box/membrane system is employed on novel PSA tail gas (at 5 to 10 Bara pressure, about 72.5 psia and about 145 psia), an aMDEA unit, for syngas CO2 recovery is not required, as the cold box unit recovers carbon dioxide from the PSA purge gas (after compression) in a cold box type cryogenic carbon dioxide separation unit. The remaining stream from the cold box is processed in a membrane unit to recover two separate streams; a raw hydrogen stream at low pressure (but greater than about 1.2 Bara, 17.4 psia) to be used as reformer fuel, and a second stream containing remaining hydrocarbons. This hydrocarbon stream is compressed as required, and recycled back to the reformer as part feed. A flue gas carbon dioxide recovery system is not required.

In another embodiment, at least about 99% of the available carbon dioxide is recovered from a high pressure syngas stream upstream of PSA using a conventional technology such as, but not limited to, aMDEA or a cold box/membrane unit that are well proven and cost effective from capital and energy requirements view point. Any appropriate conventional technology known to the skilled artisan is appropriate.

Other embodiments may comprise additional units such as a syngas carbon dioxide recovery unit and/or a membrane purification unit. Other embodiments may comprise additional units such as a combined cold box and/or a membrane purification unit. These additional units may be used in any combination recognized as plausible by the skilled artisan.

Illustrative embodiments have been described above. While the method in the present application is susceptible to various modifications and alternative forms, specific embodiments thereof have been shown by way of example in the drawings, and have been herein described in detail. It should be understood, however, that the description herein of specific embodiments is not intended to limit the method in the present application to the particular forms disclosed, but on the contrary, the method in the present application is to cover all modifications, equivalents, and alternatives falling within the spirit and scope of the method in the present application, as defined by the appended claims.

It will, of course, be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but, would nevertheless, be a routine undertaking for those of ordinary skill in the art, having the benefit of this disclosure.

What is claimed is:

1. A method of re-distributing CO2 balance from reformer furnace flue gas to the high pressure syngas exit water gas shift reaction unit; comprising:

providing a first gas mixture;

introducing said first gas mixture into a pre-reformer followed by a primary reformer, or directly into a primary reformer, thereby generating a second gas mixture comprising hydrogen, carbon monoxide, carbon dioxide;

introducing said second gas mixture into at least one isothermal shift reactor, or a combination of high followed by a low temperature shift reactor, or a medium temperature shift reactor, thereby generating a third gas mixture;

introducing said third gas mixture into an amine wash, wherein said third gas is separated into a fourth gas mixture and a carbon dioxide enriched stream;

introducing said fourth gas mixture into a low recovery PSA, wherein said fourth gas is separated into a hydrogen enriched stream and a PSA purge gas stream;

introducing said purge gas from the low recovery PSA to the reformer furnace as fuel;

wherein no additional supplemental fuel is sent to the reformer furnace, wherein said low recovery PSA has a hydrogen recovery between about 50% and about 65%, wherein the low recovery PSA unit delivers a sufficient quantity of fuel by varying the hydrogen % recovery within the low recovery PSA unit such that no additional supplemental fuel to the reformer furnace is required.

2. The method of claim 1, wherein the number of adsorption beds is between 8 and 10.

3. The method of claim 1, wherein the hydrogen recovery of said low recovery PSA is adjusted such that the PSA purge gas stream heat content as fuel is sufficient to satisfy the fuel demand of the primary reformer.

4. The method of claim 1, wherein said PSA purge gas stream has a pressure of between about 5 bara and about 10 bara.

5. The method of claim 1, wherein said PSA purge gas stream has a pressure of greater than about 1.2 bara.

* * * * *